UNITED STATES PATENT OFFICE.

JAMES DOUGLAS, JR., OF QUEBEC, CANADA.

IMPROVEMENT IN EXTRACTING SILVER FROM ITS ORES.

Specification forming part of Letters Patent No. 148,356, dated March 10, 1874; application filed December 29, 1873.

*To all whom it may concern:*

Be it known that I, JAMES DOUGLAS, Jr., of the city and district of Quebec, in the Dominion of Canada, being a British subject, and resident in the Province of Quebec, in the Dominion of Canada, have invented a new and useful Improvement in the Art of Extracting Silver from its Ores; and I do hereby declare that the following is a clear, full, and exact description of the nature and operation of the said improvement.

The said improvement has for its object the economy of salt in the process of extracting silver from its ores by chloridization.

As ordinarily conducted, the process of chloridizing silver ores consists in roasting the sulphur, antimonial and other compounds of silver, and associated metals with common salt. The result of this roasting is that the silver, and most of the other metals associated with it, are converted, in whole or part, into chlorides, some of which chlorides are soluble in water, others not. The ore thus chloridized in the furnaces is then agitated with mercury and water in pans or barrels, by which means an amalgam of silver, gold, and certain of the base metals present in the ore is formed, and the chlorides soluble in water are dissolved. The water containing these chlorides in solution is at present allowed to run to waste; but from these liquors, holding, as they do, in solution these soluble chlorides, which may consist, besides the chlorides of zinc and of other base metals, of a variable quantity of chloride of sodium, which escaped decomposition in the roasting-furnace, I propose to recover the salts and to use them for the purpose of chloridizing fresh ore. This may be done either by evaporating said liquors to dryness, or, in certain cases, till some only of the chlorides have crystallized out.

After the amalgamation has been effected, both the pulp and the liquors in which it is suspended, and which contain the chlorides to be recovered, may be received in sluice-pits, where the insoluble matter must be allowed to settle, and whence the clear supernatant liquors must be drawn off to be evaporated by the waste heat of the furnace or otherwise. The evaporating-pans, if waste furnace-heat be used, may be built into the floor of the furnace-flue, which must be provided with doors at suitable distances, or they may be made to form the roof of the flue. The chlorides of sodium and of other metals, which will gather in the evaporating-pans, will serve to chloridize fresh ore, and will thus economise the consumption of salt, or of any other chloride which might be used.

There may be cases in which it is desirable to crystallize out a part only of the salts in solution in the waste liquors—as, for instance, when copper is present in the furnace-charge, which it is wished to save. In such case, if the chloride-of-iron bath employed in the Hunt and Douglas patent copper process be used to extract the copper, the evaporation must be carried to such a point that the chloride of iron shall remain in solution in the mother liquors. The solubility of chloride of iron is such that it will remain in solution when the other chlorides present shall have almost entirely crystallized out.

I do not claim any particular contrivance for collecting said waste liquors, nor yet for evaporating them.

What I do claim is—

The process of utilizing the waste liquors of the ordinary ore-chloridizing process, by allowing the insoluble matters contained in said liquors to precipitate, and then evaporating the clear supernatant liquid to obtain the soluble chlorides, which are reapplied in treating fresh ore, as set forth.

JAMES DOUGLAS, Jr.

Witnesses:
H. GOWEN,
F. OLIVER.